United States Patent [19]
Williamson

[11] 3,901,339
[45] Aug. 26, 1975

[54] HYDROSTATIC DRIVE-STEER SYSTEM

[75] Inventor: William A. Williamson, Niles, Mich.

[73] Assignee: Clark Equipment Company, Buchanan, Mich.

[22] Filed: Apr. 15, 1974

[21] Appl. No.: 461,068

[52] U.S. Cl. ............... 180/6.48; 180/44 F; 180/52; 180/66 F
[51] Int. Cl. ............................................ B62d 11/04
[58] Field of Search ............ 180/6.48, 6.3, 6.5, 44 F, 180/51, 52, 66 R, 66 F, 79.2 R

[56] References Cited
UNITED STATES PATENTS

| | | | |
|---|---|---|---|
| 2,334,918 | 11/1943 | French | 180/79.2 R |
| 2,362,636 | 11/1944 | Joy | 180/6.5 |
| 3,759,295 | 9/1973 | Dence | 180/6.3 |

*Primary Examiner*—David Schonberg
*Assistant Examiner*—John A. Pekar
*Attorney, Agent, or Firm*—John C. Wiessler

[57] ABSTRACT

A hydrostatic control for a vehicular dual path hydrostatic reversible drive-steer wheel assembly in which a pair of wheels is mounted for dirigible movement which may be mounted from a common rotatable shaft, the wheels being drivable and steerable by controlling the differentiation of wheel speed in either direction during transition between steering angles. A flow divider-combiner unit controls the volume flow to the wheels in one direction of travel and from the wheels in the other direction, the steering control being functionally intermediate the flow divider-combiner and the wheel assembly for transferring one or more units of fluid volume or pressure from one wheel circuit to the other wheel circuit to effect transitory wheel speed differentiation and thereby turning of the steer wheel assembly to a different steering angle. The hydrostatic control is also operative with independently mounted drive-steer wheels connected by the usual steering control rod.

12 Claims, 6 Drawing Figures

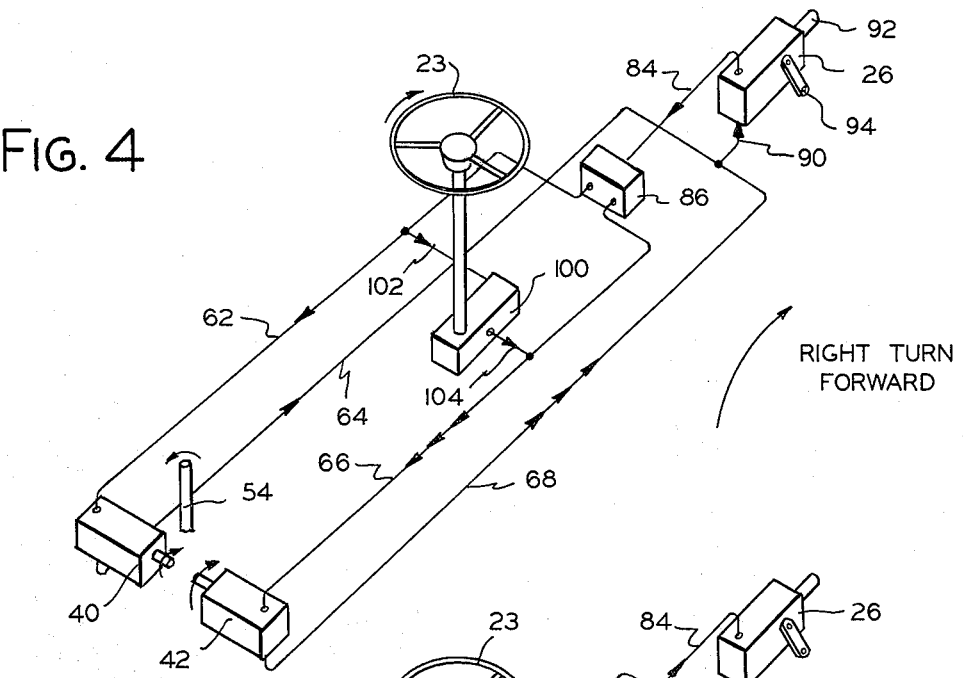
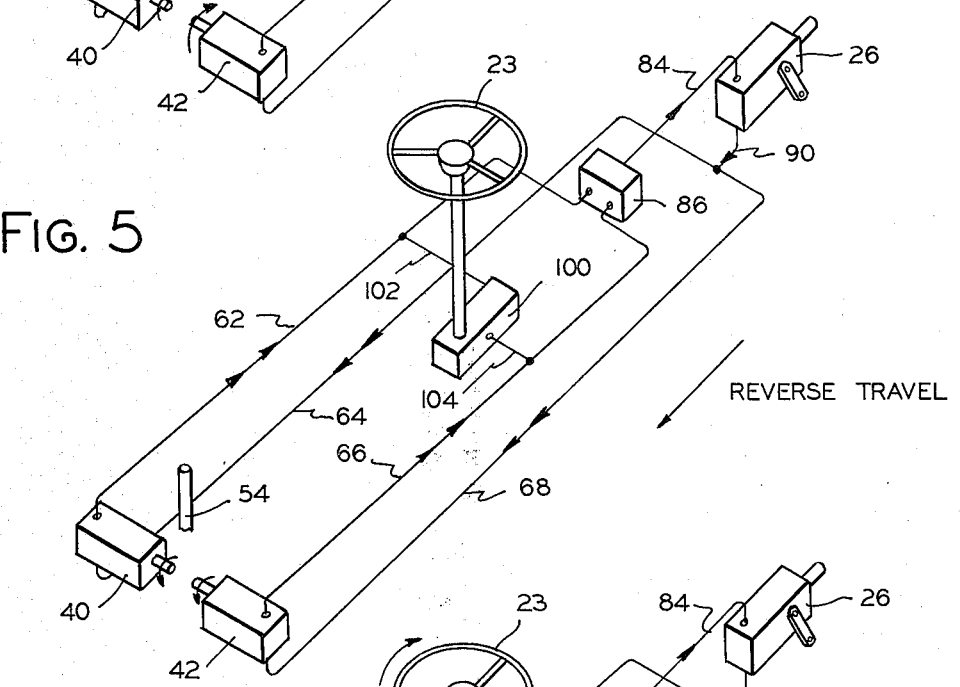
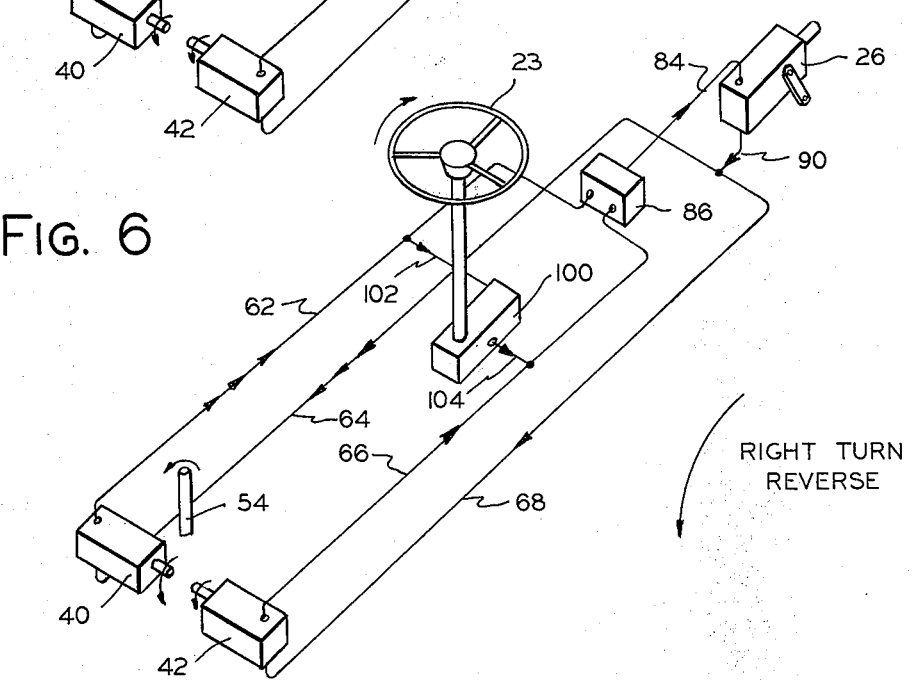

HYDROSTATIC DRIVE-STEER SYSTEM

The field of art to which the invention pertains includes controls for hydrostatic drive-steer wheels.

It is a primary object of the invention to provide in a system having a pair of drive-steer wheels with independent traction drive means a hydrostatic steering control for differentiating the speed of the wheels during dirigible movement thereof.

Another object is to provide an improved hydrostatic steering system in which steering control is effected as between independently motor driven dirigible wheels by operator controlled transfer of an increment of fluid volume from one wheel circuit to the other wheel circuit to effect transitory wheel speed differentiation.

Additional objects and advantages of the invention will become apparent to persons skilled in the art in view of the following description taken in conjunction with the drawings, wherein:

FIGS. 3, 4, 5 and 6 are schematic circuit diagrams illustrating the drive and steering hydrostatic control circuit of my invention in various modes of operation.

Figure 1:
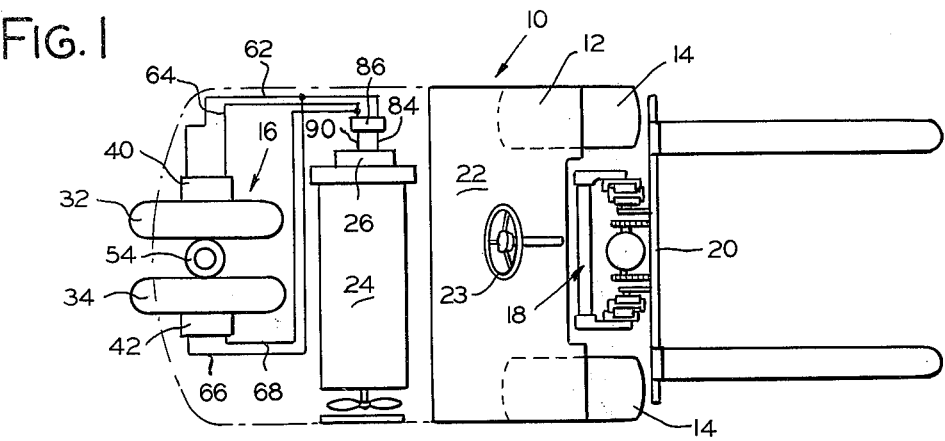
FIG. 1 is a schematized plan view of a lift truck which embodies my invention.

The embodiment of my invention as illustrated in the circuit diagrams of FIGS. 3–6 will be described, for convenience, in conjunction with the dual path drive-steer wheel assembly of FIG. 2, the details of which are disclosed in my co-pending application Ser. No. 313,063, filed Dec. 7, 1972. The system is disclosed diagrammatically in FIG. 1, again for convenience, in conjunction with a fork lift truck. However, it should be understood that my invention has application in various types of vehicles in addition to the lift truck of FIG. 1, such as for front drive-steer wheels for a rubber tired compactor, in combination with independently mounted wheels, and including modes of steering such as two-wheel Ackermann, four-wheel radi-arc, or crab steering. Furthermore, various combinations of one or more wheel assemblies as shown in FIG. 2 as in pairs or gangs of such wheels mounted in parallel and/or in tandem combinations, as noted in my above co-pending application, may be utilized in the application of the present invention. However, I have chosen for convenience to illustrate only the exemplary embodiment to be described below, which is entirely adequate to illustrate the principles of the invention.

The lift truck illustrated at numeral 10 includes a chassis 12 mounted at the forward end from a pair of non-dirigible, non-traction wheels 14 and at the rear end from a dual hydrostatic wheel assembly shown generally at numeral 16. From the front end of the truck is mounted a conventional mast assembly 18 having a fork carriage 20 mounted for elevation thereon. An operator's compartment 22 is located for sit-down rider control, but the instrumentation and controls are not illustrated except a steering wheel 23. An engine 24 is located generally centrally of the truck and extends transversely thereof, being adapted to drive a variable displacement main drive pump 26 which is hydraulically connected to drive hydrostatic wheels 32 and 34 mounted from a transverse truck frame member 30 (FIG. 2).

The dual wheel assembly includes transversely spaced wheels 32 and 34 which are mounted for traction drive in forward or reverse about a common axis 36 and for dirigible movement right or left about a common axis 38. The wheels are adapted to be driven independently by hydraulic drive motors 40 and 42 which are mounted on a pair of spaced downwardly extending support arms 44 and 46 which are in turn secured to oppositely extending arms 52 and 53. Arms 52 and 53 are integral with a single rotatable support shaft 54 mounted for rotation in bearings 56 and 58 of frame member 30. Shaft 54, extending arms 52 and 53, and support arms 44 and 46 together comprise an inverted generally Y-shaped yoke for the wheels and motors.

Figure 2:
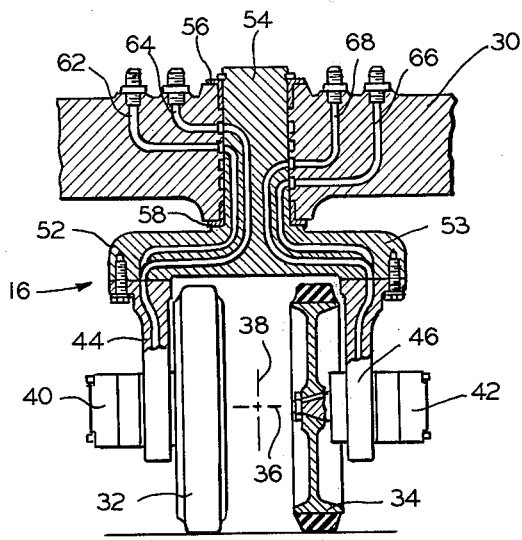
FIG. 2 is an enlarged partial sectional view of a hydrostatic dual wheel assembly.
Figure 3:
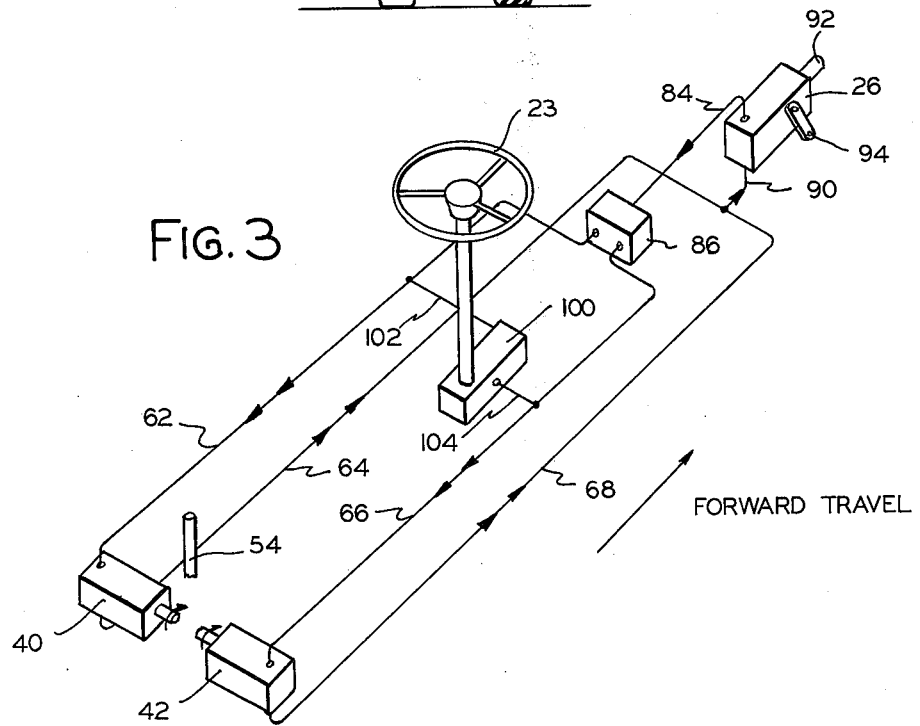

Pairs of hydraulic conduits 62, 64 and 66, 68 extend through the frame member and yoke, as shown, for connection to motors 40 and 42, respectively, and to the main pump 26 as shown in FIGS. 1 and 3. Interior pairs of annular grooves 74, 78 and 80, 82 are in registry with pairs of conduits 62, 64 and 66, 68, respectively, which provides continuous communication throughout each of the various conduits 62, 64, 66 and 68 regardless of the rotative position of shaft 54 and without affecting the fixed relative position of any part of any such conduit. Further details of the wheel assembly per se as shown in FIG. 2 are described in my above-identified co-pending application.

In the fluid circuit disclosed in FIGS. 3 and 5, forward vehicle drive is assumed to be with the transmission fluid circulating from the pump through a conduit 84 and a flow divider-combiner unit 86 through forward drive pressure conduits 62 and 66 to the motors, return pressure fluid being directed back to the pump inlet by way of conduits 64 and 68 and a conduit 90. The pump 26 being reversible, the flow of transmission fluid is reversed for a reverse direction of vehicle travel, as shown in FIG. 5, unit 86 functioning as a flow divider in forward drive and as a flow combiner in reverse drive. A suitable type of flow divider-combiner unit for the present purpose is manufactured by Fluid Controls, Mentor, Ohio, Model 2V14. It should be noted that pump 26 is preferably of a variable displacement piston type having an engine connected drive shaft 92 driven through suitable reduction gearing, and an operator's accelerator control lever 94 which is adapted to vary the swash plate angle, for example, in both forward and reverse drive.

In FIG. 3 it will be noted that arrows are utilized to signify the assumed direction of vehicle travel, forward in a straight-ahead or non-dirigible mode wherein motors 40 and 42 are driving wheels 32 and 34 at equal speeds as signified by the equal length rotational direction arrows at the drive shafts thereof, whereby equal volumes of pressure fluid flow through conduits 62 and 66 to drive motors 40 and 42, as controlled by the divider function of unit 86, and said equal volumes are returned from the drive motors to the pump inlet by way of conduits 64 and 68, all as signified by double arrowheads in each of said conduits. So long as this condition exists the vehicle is driven forwardly in a straight line at a speed determined by the setting of pump control displacement lever 94.

Contrariwise, FIG. 5 exemplifies a condition in which the vehicle is traveling in a straight line in reverse, in which mode the condition of all elements is the same as in FIG. 3 except that the flow is in a reverse direction through motors 40 and 42, the output of the pump 26 being into conduits 90, 64 and 68, and the flow control 86 functioning as a flow combiner establishing equal volume flow in the low pressure return lines 62 and 66.

Again, the double arrows in all conduits signify straight line movement of the vehicle in a reverse direction of travel.

It will be appreciated by persons skilled in the art as the description proceeds that, at least for travel in a forward direction, the combination of the pump 26 and flow divider function of unit 86 may be duplicated by equivalent means such as a pair of variable displacement pumps operated by a common drive shaft, for example, and having the displacement controls interconnected for dividing the flow equally between the circuits which are connected to motors 40 and 42.

Operator steering wheel 23 is connected suitably to a fluid displacement unit 100 for the purpose of transferring unit volumes of pressure fluid from conduit 62 to conduit 66 when wheel 23 is turned in a clockwise direction, said conduits being connected to said unit 100 by lines 102 and 104. The displacement unit 100 may include a pair of intermeshing gears, as a gear pump, connected so as to be rotated by steering wheel 23 a number of degrees which is proportional to the rotation of the steering wheel, and by rotation to transfer a volume of fluid from conduit 62 to conduit 66 which is proportional to the steering effect desired. As shown in FIG. 4, transferral of one or more volume units of pressure fluid is indicated by the arrowed lines 102 and 104 upon such turning of wheel 23 in which the increase in volume in conduit 66 is signified by three arrowheads and the decrease in volume in conduit 62 by the single arrowhead. Likewise signified are the flows in the return conduits 64 and 68.

Inasmuch as the hydraulic fluid is incompressible and the flow divider function of unit 86 equally divides the pump output between conduit 62 and 66, the effect of increased flow at the same pressure in conduit 66 causes a decrease in flow at said pressure in conduit 62 which in turn causes motor 42 to rotate wheel 34 at a transitory rpm which is greater than the rpm of said wheel as shown in FIG. 3, and, contrariwise, causes motor 40 to rotate wheel 32 at a speed less than the rpm of said wheel in FIG. 3, all as signified by the length of the direction of rotation arrows at the motors in FIG. 4 as compared with FIG. 3. The differential wheel speed thus effected causes the wheel assembly to rotate in the direction indicated by the directional arrow at shaft 54 until the effect of the volume of fluid transferred from conduit 62 to 66 is dissipated, whereupon motors 40 and 42 again drive the respective wheels at equal speeds and at a steering angle proportional to the said volume of fluid initially displaced by steering pump 100. Of course, the differential speed effected at the drive motors and the resultant steering angle are functions of the angular velocity and the number of degrees of turn of steering wheel 23. In any condition of equal rpm of wheels 32 and 34, whether traveling straight ahead as in FIG. 3, or traveling at a fixed angle of steer following rotation of wheel 23, no fluid is transferred from conduit 62 to 66 because steering pump 100 is at rest.

It will be understood that a reversal of direction of the steering wheel from that shown in FIG. 4 effects an opposite result from that described above to turn the vehicle either back to a straight line forward direction of travel, as in FIG. 3, or if the steering wheel is actuated further in a counterclockwise direction to effect a left forward turn, the fluid being displaced by steering pump 100 in that event in an opposite direction from that illustrated in FIG. 4. Symbolically this may, of course, be shown by three arrowheads in conduits 62 and 64, and by one arrowhead in conduits 66 and 68.

Referring now to FIG. 6, a condition is therein illustrated in which the operator while traveling as in FIG. 5 rotates wheel 23 in a clockwise direction to demand a right turn in reverse. In this mode of operation the result is the same as in FIG. 4 insofar as the operator is aware, but for somewhat different reasons resulting from the effect of operating steering pump 100 in a flow condition upstream of divider-combiner unit 86 instead of downstream thereof as in FIG. 4.

Turning wheel 23 as indicated results in diverting oil from low pressure return line 62 to return line 66, but flow combiner 86 prevents a differential flow volume as between conduits 62 and 66 so that the divergence of oil by steering pump 100 causes an increase in back pressure in conduit 66 on motor 42 which is also sensed in conduit 68, but not in conduit 64. The excess flow from pump 26 will therefore be automatically diverted into conduit 64 during transition from one steering angle to another, the effect being an increase in rpm at motor 40 and a decrease at motor 42 causing a differential wheel speed as indicated by the length of the direction of rotation arrows which results in a right turn in a reverse direction of travel of the vehicle. Again, the speed and number of degrees of turn imparted to steering wheel 23 determines the speed of transition to a new steering angle and the degree of change in steering angle. The opposite effect occurs in reverse drive when the steering wheel is turned in an opposite direction from that indicated in FIG. 6.

Although I have illustrated and described with particularity only one embodiment of my invention, it will be understood by those skilled in the art that modifications may be made in the structure, form and relative arrangement of parts without necessarily departing from the spirit and scope of the invention. Accordingly, it should be understood that I intend to cover by the appended claims all such modifications which fall within the scope of my invention.

I claim:

1. In a hydrostatic drive-steer system for vehicles having first and second dirigible drive wheels mounted for dirigible movement about a common vertical axis, hydraulic first and second motors for driving respective ones of said wheels, a first hydraulic drive circuit connected to the first motor and a second hydraulic drive circuit connected to the second motor, means for supplying pressure fluid to said first circuit in a volume substantially equal to and independent of the pressure fluid which it supplies to said second circuit, and means for transferring a unit volume of fluid from said first circuit to said second circuit to effect a differential wheel speed whereby to cause the wheels to turn about said vertical axis, said latter means comprising a conduit connecting said first circuit to said second circuit and an operator operated device in said conduit for transferring said fluid unit volume from said first circuit to said second circuit.

2. The system as claimed in claim 1 wherein said wheels are also mounted for rotational tractive movement about a common horizontal axis.

3. The system as claimed in claim 2 wherein said wheel mounting includes a generally inverted Y-shaped yoke, the upper leg of which supports the wheels in the vehicle chassis and which is rotatable on said vertical axis, said first and second wheels being mounted from the lower spaced legs of said yoke for tractive movement about said horizontal axis, said first and second motors being also mounted from the respective lower spaced legs of said yoke.

4. The system as claimed in claim 3 wherein said first and second circuits include conduit means connecting said first and second motors through said yoke.

5. The system as claimed in claim 1 wherein said pressure fluid supply means comprises an engine driven pump connected to a flow divider, said flow divider dividing the output of said pump to said first and second circuits.

6. The system as claimed in claim 5 wherein said fluid pressure supply means is reversible to supply pressure fluid in a reverse direction in said first and second circuits to reverse the direction of rotation of the first and second motors and of the direction of rotation of the drive wheels, said flow divider functioning as a flow combiner in the fluid return conduits of said first and second circuits.

7. The system as claimed in claim 6 wherein said operator operated device is functionally upstream of said flow combiner during such travel in a reverse direction and functions to change the pressure levels as between said first and second circuits in such a manner as to effect a change in fluid volume to said first and second motors so as to cause a differential wheel speed in reverse for turning the wheels.

8. The system as claimed in claim 1 wherein said operator operated device comprises a steering pump operated by a steering wheel or the like for transferring a fluid unit volume from said first circuit to said second circuit which is proportional to the steer angle demand by the operator.

9. The system as claimed in claim 1 wherein said pressure fluid supply means includes a flow divider-combiner for dividing the volume flow to the first and second motors in one direction of travel and combining the volume flow from the said motors in the opposite direction of travel, said operator operated device being adapted to transfer a fluid unit volume from said first circuit to said second circuit as a function of the operator steer angle demand, thereby effecting speed differentiation as between the first and second wheels causing dirigible movement of the wheels.

10. The system as claimed in claim 1 wherein said operator operated device comprises a gear pump, a steering wheel or the like connected to said gear pump for operating it to displace a volume of fluid from said first circuit to said second circuit which is proportional to the degree of turning of the steering wheel or the like, which in turn effects a differential wheel speed as between said first and second wheels which is proportional to the fluid volume so transferred, which in turn causes dirigible movement of said first and second wheels to establish a steering angle proportional to the fluid volume so transferred.

11. In a hydrostatic drive-steer system for vehicles having first and second dirigible drive wheels mounted for dirigible movement about a common vertical axis, hydraulic first and second motors for driving respective ones of said wheels, a first hydraulic drive circuit connected to the first motor and a second hydraulic drive circuit connected to the second motor, a variable displacement drive pump, a flow divider connected to said pump and to said circuits for dividing the pump output substantially half and half to said first and second motors for driving said motors in one direction, an operator's operated steering device intermediate said flow divider and said motors and a conduit connecting said steering device to said first and second drive circuits, said steering device being adapted to transfer a volume of fluid from one of said circuits to the other of said circuits to effect a differential speed between said motors and wheels whereby to turn said wheels to a steering angle which is proportional to the volume of fluid transferred and in a direction dependent upon the fluid volume transfer from said circuit to said second circuit, or vice versa.

12. The system as claimed in claim 11 wherein said pump and motors are reversible for reversing the direction of travel, a flow combiner controlling during such reversal of travel the return flow of fluid from said first and second motors in substantially half and half relation and combining and directing the flow to the pump inlet, said steering device operable upstream of said flow combiner and between the return fluid lines of said first and second circuits to cause a differential pressure as between said first and second circuits whereby to cause a differential volume flow to said motors to drive the latter at a differential speed in a reverse direction whereby to steer the wheels in one direction or the other in reverse.

* * * * *